United States Patent [19]

Schreiner et al.

[11] 4,088,346

[45] May 9, 1978

[54] FOLDABLE IMPLEMENT

[75] Inventors: Lester Dale Schreiner; Ronald Michael Steilen, both of Ankeny, Iowa

[73] Assignee: Deere & Company, Moline, Ill.

[21] Appl. No.: 773,815

[22] Filed: Mar. 3, 1977

[51] Int. Cl.² ............................................. B62B 11/00
[52] U.S. Cl. .................................... 280/656; 172/311; 172/456
[58] Field of Search ................ 280/639, 656; 172/456, 172/311, 662; 111/54, 55; 56/228, 385

[56] References Cited

U.S. PATENT DOCUMENTS

| 3,122,210 | 2/1964 | French | 172/456 |
| 3,523,699 | 8/1970 | Sinkule | 280/412 |
| 3,539,016 | 11/1970 | Baner | 172/456 |
| 3,548,954 | 12/1970 | Lindemann | 172/456 |
| 3,982,773 | 9/1976 | Stufflebeam | 280/656 |
| 4,042,044 | 8/1977 | Honnold | 172/311 |

Primary Examiner—Robert R. Song

[57] ABSTRACT

An agricultural implement includes a main frame and tool-carrying outer sections foldable between transversely extending operational and fore-and-aft extending transport positions. The folding mechanism transversely separates the inner ends of the outer sections as it simultaneously rotates the sections rearwardly into transport position. Tools supported on adjacent ends of the sections are thus separated to eliminate interference therebetween during transport.

12 Claims, 5 Drawing Figures

FOLDABLE IMPLEMENT

BACKGROUND OF THE INVENTION

The present invention relates generally to agricultural implements and more particularly relates to implements capable of being folded between operational and transport configurations.

Modern drawn and integral implements are wider and heavier than their earlier counterparts as manufacturers attempt to provide implements which will increase farmer productivity and profitability. As implements are increased in size, transport and storage present additional difficulties. To reduce the size of implements during transport and storage, various approaches have recently been utilized including rearwardly and upwardly folding implement frames.

When implement frames are folded rearwardly, it is necessary to prevent the tools mounted at the ends of the adjacent sections from interfering with one another. Consequently, some existing rear fold implements utilize means to elevate the tool-supporting toolbars on all sections prior to folding while others provide wing sections which are rearwardly offset from the center section by an amount equal to the tool support length. In those implements which elevate the working tools, pivotal connections between the toolbars must be structurally strengthened and hydraulically operated linkages increase both manufacturing and maintenance expenses. In those implements wherein the wing sections are rearwardly offset from the center section tool-carrying portion, the tools on the center section operate along a transverse line forwardly spaced of that transverse line along which the outer sections operate. Accordingly, the tools along each line will often penetrate to different levels as undulating ground contours are encountered.

Many existing rearwardly folding implement frames have no powered means to assist in folding, but are folded as the operator slowly advances the implement across the field. To unfold the outer sections in this type of implement, it must be slowly backed up. Oftentimes, the wheels of one outer section will hang up on some small ground obstacle making the folding process time consuming and burdensome.

Some upwardly folding implement frames require structural reinforcement to support the elevated tools and wings and many times encounter high maintenance expenses. Further, upwardly folding sections having wide outer sections often extend too high when folded and prevent transport beneath rural power lines, trees and other similar low-hanging obstacles. Thus, these toolbars are limited as to maximum practical widths.

SUMMARY OF THE INVENTION

The principle object of the present invention is to provide a multi-sectional rear folding agricultural implement on which the tools mounted on adjacent section ends do not interfere with one another as the sections are folded into transport configurations. It is further an object to provide a folding implement which can be simply and quickly folded between operational and transport configurations.

Also an object is to provide a folding implement wherein the tools carried by the adjacent toolbars operate along a single transverse line to thereby maximize depth control over undulating terrain.

Another object is to provide means which will permit limited lateral movement of the trailing outboard sections during transport whereby tracking will be improved and skidding of the trailing sections during turning maneuvers will be minimized.

Accordingly, applicant has provided a rearwardly folding implement in which tool-carrying sections are transversely aligned and wherein interferences between tools on adjacent sections are eliminated as outboard sections are shifted laterally and rotated into transport configurations. Further, there is provided limited lateral movement of the trailing outer sections during transport to improve tracking and maneuvering.

DESCRIPTION OF THE PREFERRED EMBODIMENT

Figure 1:
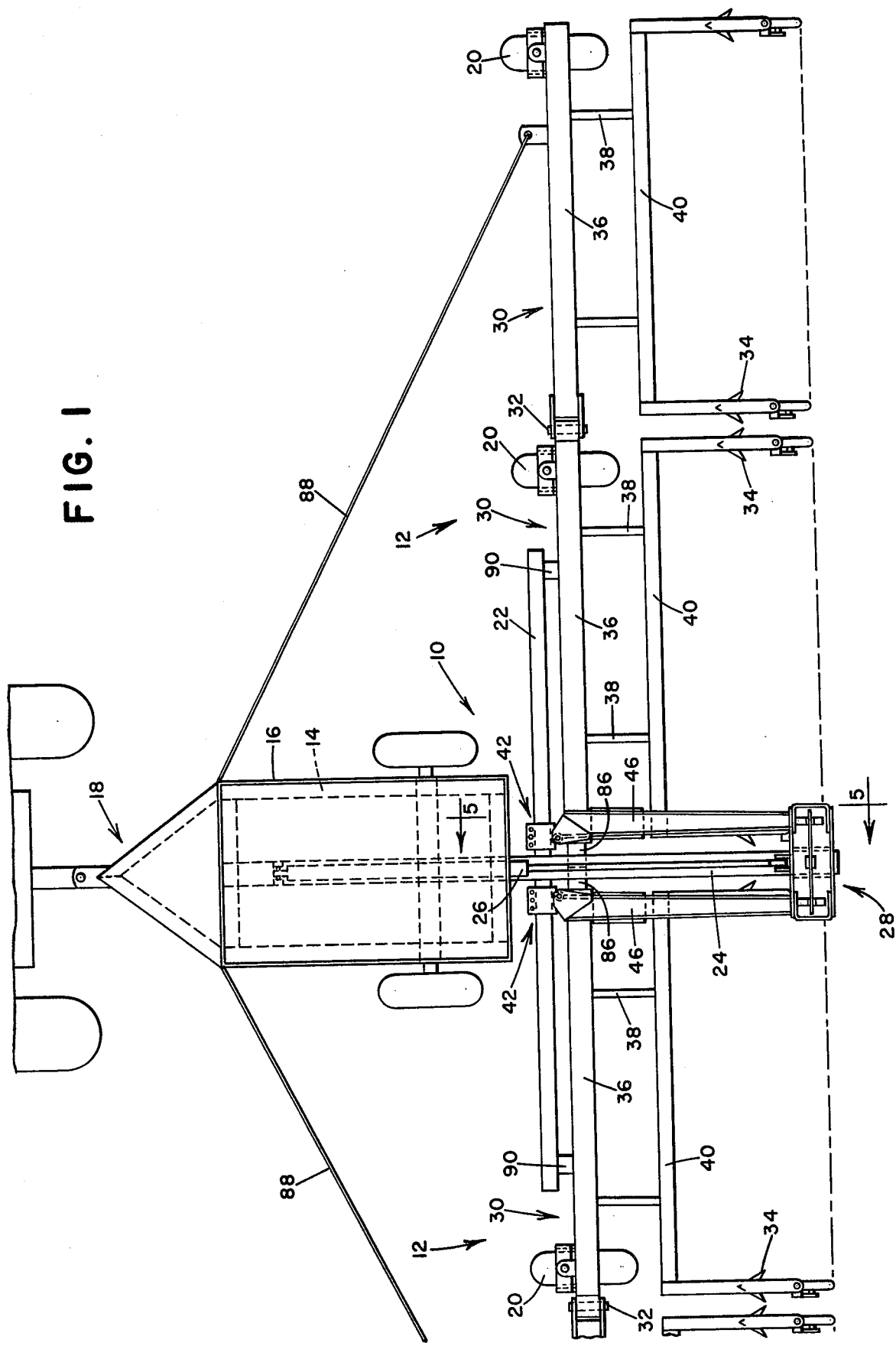
FIG. 1 is a plan view of a foldable implement having one wing portion thereof omitted and in which the principles of the present invention have been incorporated.
Figure 2:
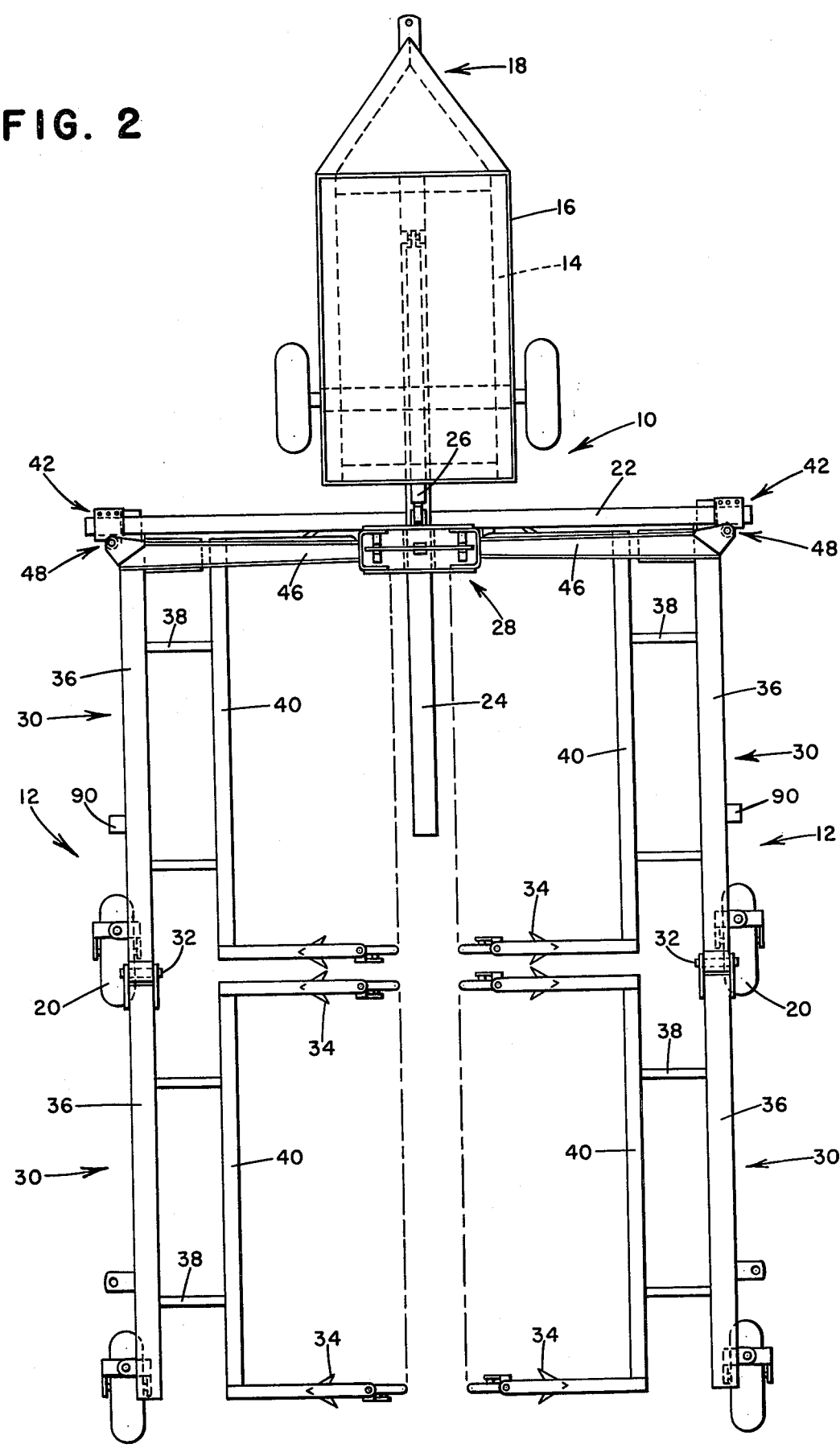
FIG. 2 is a plan view similar to FIG. 1 but illustrating the implement in its transport configuration.

Referring now to the drawings and particularly FIGS. 1 and 2, there is illustrated a folding agricultural implement having a mobile transverse center section 10 and a pair of tool-carrying outer sections 12 swingably shiftable between first transversely extending and second fore-and-aft positions. Supporting the center or central section 10 is a mobile frame 14 having mounted thereon a hopper or grain supply tank 16 and hitch 18 for releasably coupling the implement with a prime mover such as a tractor. Supporting each other section 12 for travel over the ground and for movement between a folded and operational position are ground-engaging caster wheels 20.

The preferred embodiment illustrated in FIGS. 1 and 2 includes a transversely extending beam or frame member 22 rearwardly spaced from the grain storage tank 16. Rigidly connected to this transverse beam or guide structure 22 along the fore-and-aft center line of the hopper 16 is a horizontal guide structure or support beam 24. The beam 24 is comprised of a tubular member extending at its forward end beneath the central hopper 16 and projecting at its rearward end behind the transverse beam 22. The beam 24 is supported by the frame 14 for movement with the hitch 18 and tank 16. The guide beam 24 carries along its upper surface a hydraulically powered cylinder 26 connected to the slide or carrier 28 mounted on beam 24. The cylinder 26 is provided with a stroke length sufficient to move the carrier or sliding structure 28 towards and away from the transverse beam 22 and between the rearwardly and forwardly positions illustrated in FIGS. 1 and 2.

Each tool-carrying frame or outer section 12 is for all practical purposes a mirror image of the opposite section 12 and therefore only one section need be discussed in detail. In the preferred embodiment, the outer section 12 is comprised of two subsections 30 pivotally joined by horizontal pivot 32 with each subsection adapted to carry a plurality of rearwardly extending ground-engaging tools such as the grain drill units 34 illustrated. Each subsection 30 is comprised of a horizontal transverse frame member 36 supporting at its rear surface a pair of towbar links 38. The links 38 in turn supporting a tow tube 40 to which the grain drill units 34 are attached. The subsections 30 are transversely aligned with other subsections 30 so as to position the trailing grain drill units 34 along a common transverse line to minimize variations in depth penetration during operation.

Coupling the inner end of the outer section 12 with the center section 10 is the folding mechanism. Included as part of this mechanism are a pair of transversely shifting carriers or slide members 42 and fore-and-aft shifting slide or carrier 28. A lever arm 46 is pivotally connected between the slide members 42 and 28 and is connected with the inner end of the inner outer section frame 36. Connecting each arm 46 and its respective frame 36 with the carrier 42 is a vertical pivot structure 48 about which the outer section 12 is laterally rotated between its transverse and fore-and-aft positions.

Figure 3:
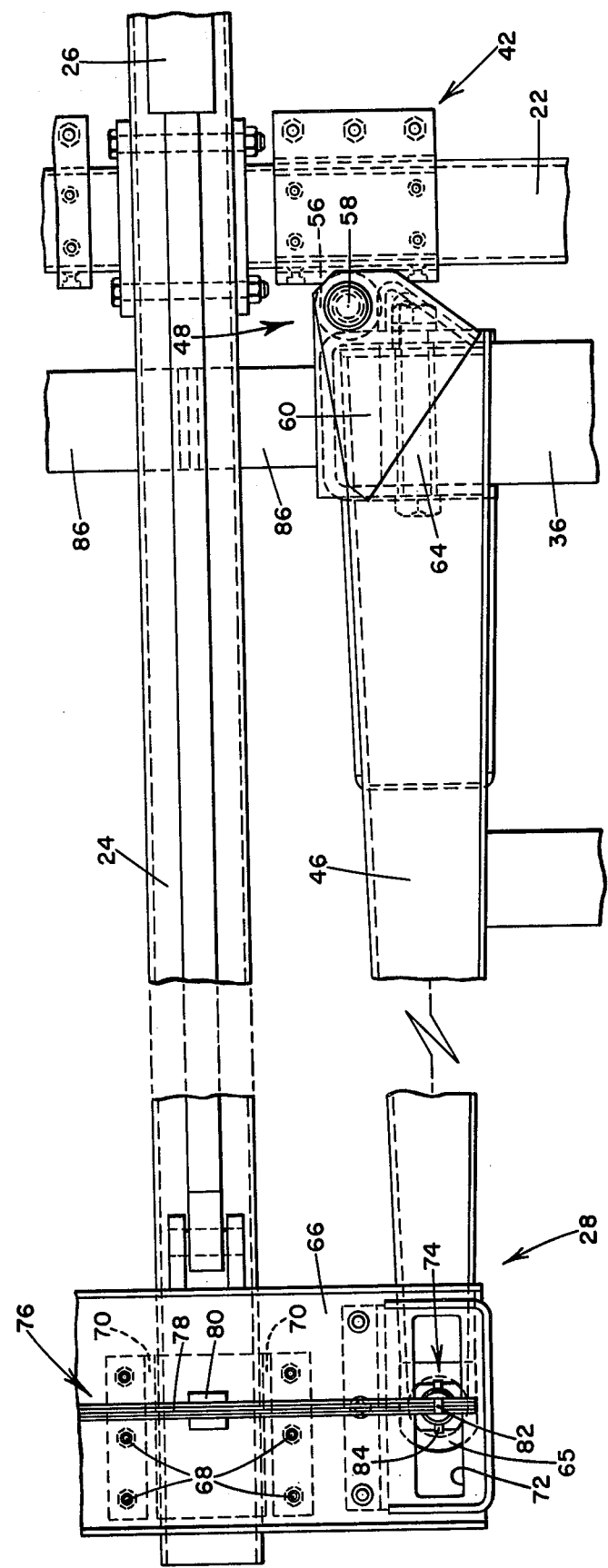
FIG. 3 is an expanded plan view of the folding mechanism as illustrated in FIG. 1 with portions broken away.
Figure 5:
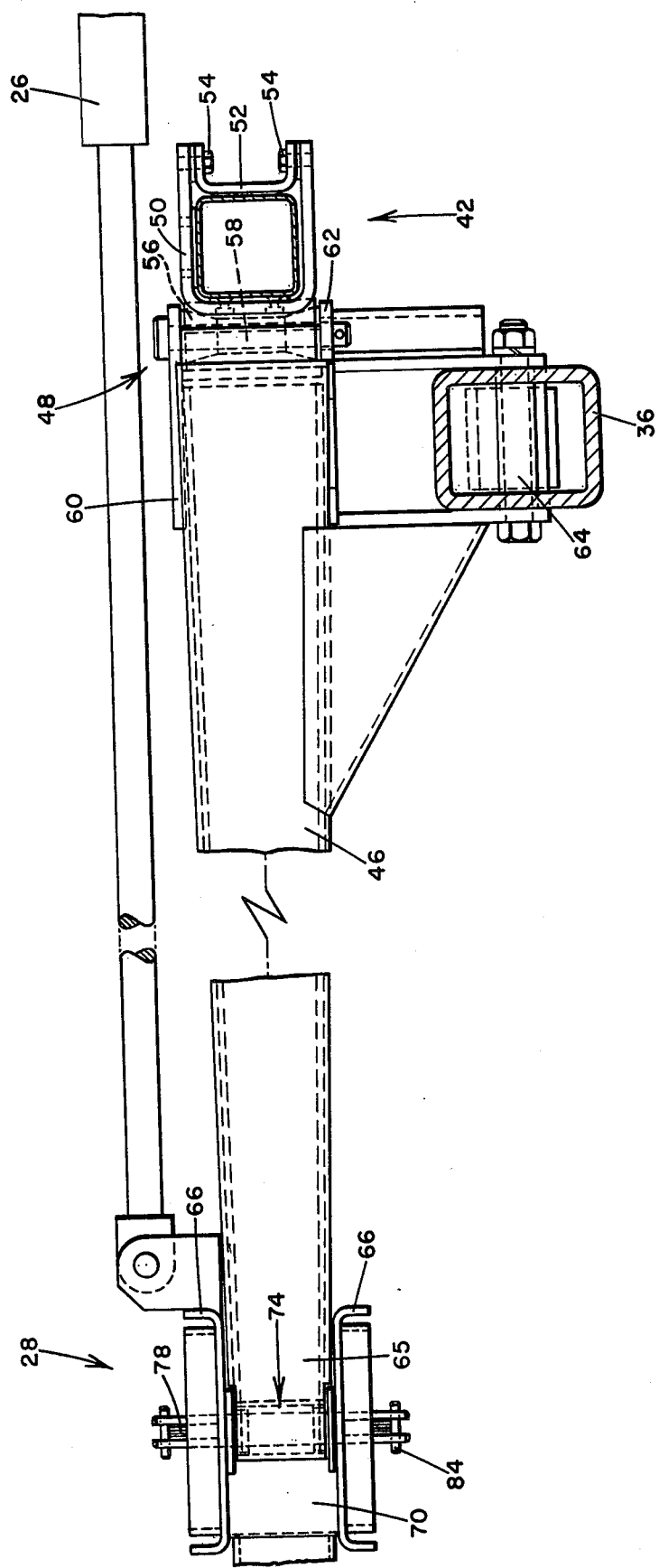
FIG. 5 is an expanded side view of the folding mechanism with portions broken away and taken along lines 5—5 of FIG. 1.

The slide member 42 is carried on the transverse beam 22 of the center section 10 and mounted for movement between a first position adjacent the fore-and-aft beam 24 and a second position adjacent the outer end of the center section beam 22. As illustrated in FIG. 5, each slide member 42 is box-like in shape and is comprised of a U-shaped member 50 joined with a C-shaped member 52 by bolts 54. The slide member 42 surrounds the transverse beam 22 of the center section 10 in sleeve-like fashion and supports along its rearward vertical surface the vertical pivot structure 48 about which the outer section 12 swings. As illustrated in FIGS. 2 and 3, each lever arm 46 is secured to the inner end portion of its respective outer section 12 and projects rearwardly therefrom along support member 24. The arm 46 is secured perpendicularly with the transverse frame 36 of the outer section 12 and extends rearwardly beyond and spaced above the tow tube 40 and the grain drill units 34.

Figure 4:
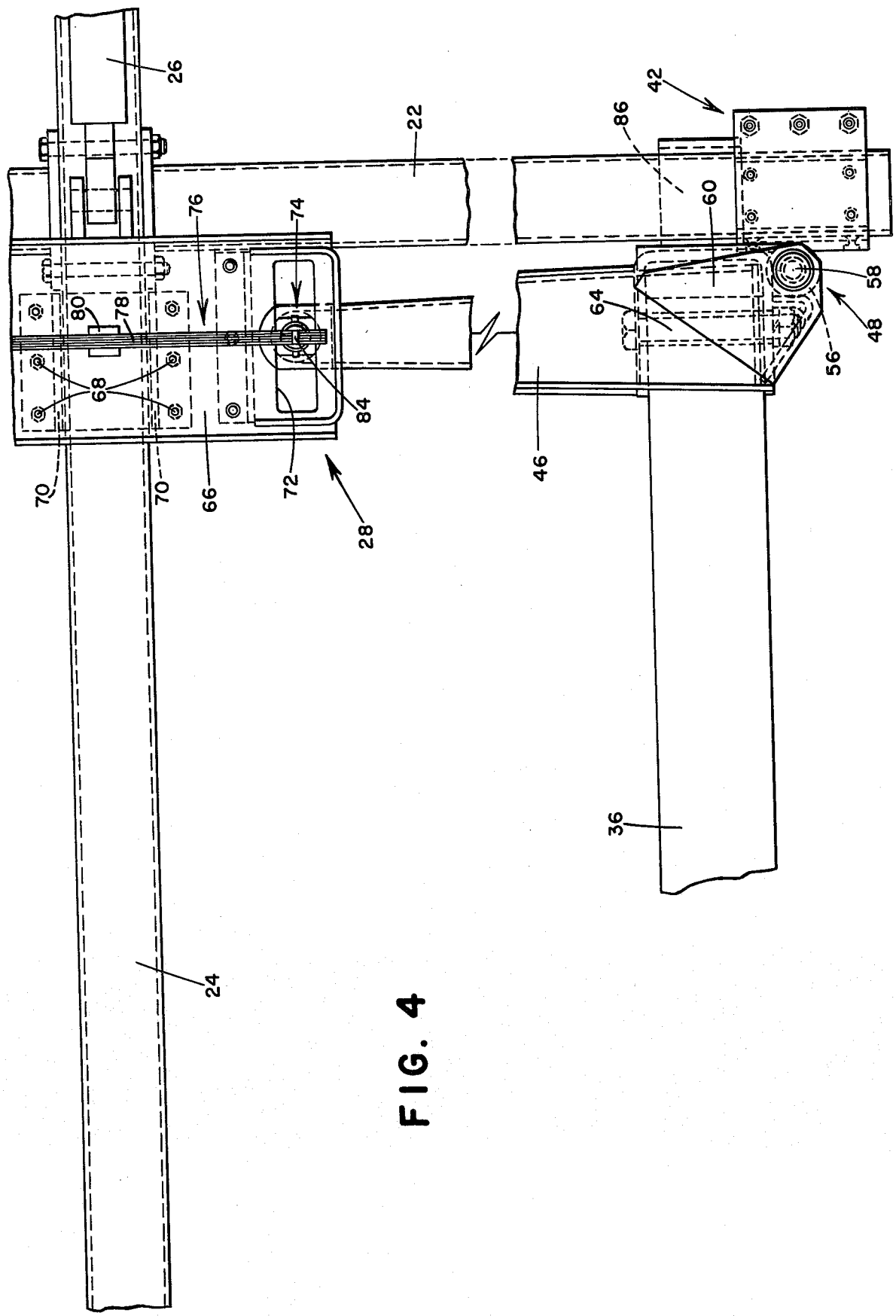
FIG. 4 is an expanded plan view of the folding mechanism as illustrated in FIG. 2 with portions broken away.

Vertical pivotal structure 48, best illustrated in FIGS. 3 and 5, includes sleeve 56 attached to the rearward side of slide member 42 by weldment or other suitable means and pin 58 is carried within the sleeve 56. The pivot 48 is supported between the plate members 60 and 62 which are rigidly carried by the upper and lower surfaces of the forward end portion of the lever arm 46. Turning now to FIGS. 3 and 4, there is illustrated a fore-and-aft extending horizontal pivot 64 provided between the outer section frame 36 and the arm 46. This pivot 64 permits the outer section 12 to flex about a horizontal axis to prevent damage to the vertical pivot structure 48 and slide member 42.

Supporting the lever arms 46 at their adjacent and terminating end portions 65 is the slide member 28 (see FIGS. 3 and 5). The slide 28 is carried on the fore-and-aft extending guide beam 24 and is comprised of spaced apart horizontal plates 66 rigidly coupled by bolts 68 to vertical plates 70 to form a channel around the beam 24. A pair of vertically opening aligned slots 72 are provided in the horizontal plates 66 parallel with and spaced from each side of the beam 24. Passing through each set of slots 72 is an upstanding pin 74 carried by the end portion 65 of the respective lever arm 46 on that side of the support member 24. The pin 74 carries a square sliding block at its ends to fit within the slots 72 and assure sliding movement therein. As best seen in FIG. 5, biasing or leaf spring means 76 are provided to urge the pin 74 towards the center of the slot 72 during transport and folding operations. The biasing means 76 includes horizontal leaf springs 78 carried by the slide 28 along the top surface and the bottom surface. Each leaf spring 78 is anchored to block 80 carried by plate 66 and passes through the slot 82 in the pin means 74, being locked therein by pin or bolt 84.

At the inner end of each outer section 12 are carried resilient bumper means 86 which abut, as illustrated in FIGS. 1 and 3, when the outer sections 12 are in their transverse or operating position. Connecting each outer section 12 with the hitch 18 and frame 14 are tow cables 88. During operation compressive forces will be created in the transverse frame member 36 of each subsection 30 as the two cables 88 tend to pull the subsections inwardly as well as forwardly. The resilient bumper means 86 attached to the inner end of each outer section 12 are provided to abut against each other and dissipate these forces so as to prevent damage to the implement structure.

At the forward surface of the subsection 30 and transversely spaced from the lever arm 46 are provided similar bumper means 90 for abutting with the transverse center beam 22 of the center section 10 to absorb the forces generated by bumping contact between the beams 22 and outer section 12 during operation.

In operation the grain drill operates in the configuration illustrated in FIG. 1. The outer sections 12 are transversely aligned to position the grain drill openers along a common line and thereby minimize variations in tool depth penetration. The center section 10 is carried by the wheels which support the grain storage tank 16 while the outer sections 12 are supported by the caster wheels 20 and slides 42 and 28 carried by the central section 10.

To move the outer section 12 from the operational position illustrated in FIG. 1 to the transport position illustrated in FIG. 2, the operator will first disconnect and store the tow cables 88. Then the hydraulic cylinder 26 will be retracted to begin shifting the outer sections 12 laterally and swinging them about their respective pivotal structures 48 to a rearwardly extending position. To aid the swinging of sections 12, the operator can slowly advance the implement as the cylinder 26 is retracted. As the cylinder 26 is retracted, the slide 28 and end portions 65 of the lever arms 46 will be slowly shifted forwardly along the beam 24 thereby forcing each respective transverse slide 42 outwardly toward its respective end of the center section support beam 22.

At the same time, movement of the lever arm 46 along the support beam 24 will cause the outer section 12 to swing about the pivotal structure 48. Occasionally, the caster wheels 20 will encounter uneven ground contours thereby retarding the movement of the outer section 12 between its operational and folded position. When this occurs, the slide member 42 may move more slowly than the slide member 28 as the hydraulic cylinder 26 continues to retract and then move rapidly as the wheel 20 passes over the uneven ground. To compensate for this difference in movement rates, the lost motion connection between each arm 46 and the slide 28 permits the pin means 74 to move within the slot 72 to permit the transverse slide member 42 to move at a slightly different rate than the fore-and-aft shifting slide member 28. Conversely, as the caster wheel 20 passes over the uneven ground, the biasing means 76 which urges the end 65 of the arm 46 back towards its normal position causes the slide member 42 to move more rapidly along the beam 22 and thereby catch up with movement of the slide member 28. With this lost motion connection and biasing means 76 there is provided the ability for the implement folding mechanism to absorb some difference in rate of movement between slide members and thereby protect the slide members 42 and 28 against binding or failing during folding operations.

Upon completion of the folding process, the rearwardly extending grain drill tools 34 will be laterally separated. No locking means is provided to secure the trailing outer sections 12 in position. However, each section 12 is provided with a means which will permit it limited lateral and swinging movement during turning and other maneuvering operations. This means includes the lost motion connection between the end of the lever arm 46, the slide member 28 and the leaf spring biasing means 76 which acts on the pin means 74 carried by the lever arm 46. During transport, the outer sections 12 will travel in fore-and-aft extending positions and each lever arm will project transversely inwardly as illustrated in FIG. 2 having their respective pin means 74 centered in their respective slot 72. The spring or biasing means 76 will serve to center each pin means 74 and the end portion 65 of that lever arm 46 in slot 72, yet will also permit the pin means 74 and end portion 65 of each arm 46 to shift along slot 72, thereby allowing the trailing outer section 12 to rotate slightly about each pivotal structure 48 as necessary. With this lost motion structure and biasing means, the operator need not secure the trailing ends of the outer sections 12 during transport nor need his implement be provided with means to lock the outer sections together during transport.

We claim:

1. A foldable agricultural implement comprising: a central hopper structure adapted at its forward end to be pulled by a tractor and having a main wheel-supported frame; a transverse guide structure connected to said hopper and extending transversely to opposite sides of the fore-and-aft center line of said hopper; a pair of transverse carrier structures mounted on the guide structure to shift transversely to opposite sides of said fore-and-aft center line with each carrier structure having a vertical pivot means; tool-supporting frames on opposite sides of and extending outwardly from said fore-and-aft center line and mounted to swing on the respective vertical pivot means, said frames having rigidly projecting fore-and-aft extending portions terminating at adjacent ends; vertical pivot structure connecting said adjacent ends; and power means operatively connected to said tool-supporting frames for shifting the carrier structures in unison toward and away from said fore-and-aft center line.

2. The invention defined in claim 1 further characterized by detachable connecting elements extending between the outer end portions of said tool-supporting frames and said hopper.

3. The invention defined in claim 1 in which each of said tool-supporting frames is a rigid L-shaped member with the fore-and-aft extending portion being one leg thereof, and the respective frames are mounted on the respective vertical pivot means of said carriers at the junctures between the legs of said L-shaped frames.

4. The invention defined in claim 3 in which the respective fore-and-aft extending portions project rearwardly from the junctures between the legs of the L-shaped frames, and the means extending between said hopper main frame and said tool-supporting frames includes a hydraulic cylinder having opposite ends connected to said vertical pivot structure and said hopper main frame.

5. The invention defined in claim 1 further characterized by a fore-and-aft extending guide structure rigid with and projecting from the transverse guide structure; and means mounting the vertical pivot structure on the fore-and-aft guide structure for shifting the former fore-and-aft on the latter.

6. A foldable agricultural implement comprising: a central hopper structure adapted at its forward end to be pulled by a tractor and having a main wheel-supported frame; carrier guide means connected to the hopper and including a central fore-and-aft extending guide structure and a transverse guide structure extending to opposite sides of the central guide structure; a pair of transverse carrier structures mounted on the transverse guide structure to shift transversely to opposite sides of said fore-and-aft guide structure with each carrier structure having a vertical pivot means; tool-supporting frames on opposite sides of and extending outwardly from said central guide structure and mounted to swing on the respective vertical pivot means of the respective carrier structures, said frames having at the inner end portion thereof rigid rearwardly projecting portions; vertical pivot structure mounted on said central guide structure for fore-and-aft movement therealong and pivotally connecting said rearwardly projecting portions; and means on said fore-and-aft extending guide structure for shifting the carrier and pivot structures along their respective guide structures.

7. A foldable agricultural implement comprising: a central hopper structure adapted at its forward end to be pulled by a tractor and having a main wheel-supported frame; carrier guide means including a central fore-and-aft extending beam structure having a forward portion connected at its forward end to the hopper frame and having a rear portion projecting rearwardly, said carrier guide means further including a transverse guide structure extending to opposite sides of the central beam and connected thereto forwardly of said rear portion; a pair of transverse carrier structures mounted on the transverse guide structure to shift transversely to opposite sides of said fore-and-aft central beam structure with each carrier structure having a vertical pivot means; tool-supporting frames on opposite sides of and extending outwardly from said central guide structure and mounted to swing on the respective vertical pivot means of the respective carrier structures, said frames having at their inner end portions rigid rearwardly projecting portions; vertical pivot structure mounted on said rear portion of the fore-and-aft beam and connecting said rearwardly projecting portions of said frames; and means on said fore-and-aft extending beam for shifting the carrier and pivot structures along their guide structures and beam portion respectively.

8. A foldable agricultural implement comprising: a main frame having a central fore-and-aft extending guide structure and transversely extending guide structure projecting to opposite sides of the fore-and-aft extending guide structure; a pair of carriers mounted on the transversely extending guide structure on respective opposite sides of the central guide structure and adapted to shift transversely thereon toward and away from the central guide structure; a central carrier mounted on the central guide structure and adapted to shift fore and aft thereon toward and away from the transverse guide structue, each of said carriers having vertical pivot means; tool-supporting frames on opposite sides of the central guide structure, each including at least one transversely outwardly extending tool-supporting portion and a rigid fore-and-aft extending portion, said tool-supporting portions being connected to swing laterally on the respective vertical pivot means on said pair of carriers and said fore-and-aft extending portions being connected to swing laterally on the vertical pivot means on said central carrier; and means connected to and for shifting said carriers.

9. A foldable agricultural implement comprising: a T-shaped main frame having a central elongated guide structure and transversely extending guide structure projecting to opposite sides of the central guide structure; a pair of carriers mounted on the transversely extending guide structure on opposite sides of the central guide structure and adapted to shift transversely thereon toward and away from the central guide structure, each of said carriers having vertical pivot means; a central carrier mounted on the central guide structure and adapted to shift longitudinally thereon toward and away from the transverse guide structure; transversely extending tool-supporting frames on opposite sides on the cental guide structure, said tool-supporting frames being connected to swing laterally on the respective vertical pivot means on said pair of carriers; arms extending between the central carrier and the pair of carriers for effecting shifting of the pair of carriers away from and toward the central guide structure as the central carrier moves respectively toward and away from the transversely extending guide structure; and means connected to and for shifting said carriers.

10. In a foldable agricultural implement having a main frame including a transverse beam and a pair of transversely extending tool-carrying outer frames, the improvement comprising: a pair of transversely shiftable members supported on the beam for movement between first adjacent and second spaced apart positions; a vertical pivot structure carried by each member and spaced fore and aft from said beam; a fore-and-aft extending horizontal beam supported by the frame between said members; a lever arm secured to each outer frame at its inner end; means connecting the inner end of each outer frame to a respective vertical pivot structure; structure shiftable along the horizontal beam between a first position spaced from the transverse beam and a second position adjacent thereto; vertical pivot means connecting each lever arm to the shiftable structure; and powered means carried by the main frame for shifting in unison said structure and members between their respective first and second positions whereby said outer frames are rotated about their respective vertical pivot structures between transversely extending and fore-and-aft extending positions.

11. A foldable agricultural implement comprising: a wheel-supported main frame including a first beam extending fore and aft and a second beam extending to transversely opposite sides thereof; a pair of shiftable members supported on the second beam and adapted for movement between adjacent positions on opposite sides of the first beam and spaced apart positions; a vertical pivot structure carried by each member; a tool-carrying outer frame extending transversely from each side of said first beam, the inner end portion of each outer frame mounted on a respective pivot structure for lateral swinging movement, said frames further including rigid rearwardly projecting arms terminating at adjacent ends; a carrier shiftably supported on the fore-and-aft beam for movement towards and away from the transverse beam, said carrier pivotally connected with the ends of said arms; and powered means operatively connected to and for shifting said carrier.

12. The invention defined in claim 10 wherein the vertical pivot means further includes means resiliently mounting each lever arm to the shiftable structure for limited horizontal movement.

* * * * *